INVENTORS
David Altman
Ernest J. Walden

United States Patent Office 3,393,517
Patented July 23, 1968

3,393,517
VARIABLE THRUST PROPULSION METHOD
USING AUXILIARY GAS GENERATION
David Altman, Menlo Park, and Ernest J. Walden, Mountain View, Calif., assignors to United Aircraft Corporation, East Hartford, Conn., a corporation of Delaware
Filed Feb. 12, 1964, Ser. No. 344,284
4 Claims. (Cl. 60—207)

This invention relates to solid-phase charges for a gas generator and more particularly to an assembly of individual fuel and oxidizer segments for producing a solid propellant grain.

Conventional solid propellant grains employed in gas generators such as rocket motors are comprised of an admixture of fuel and oxidizer. Normally, the fuel constituent is a hydrocarbon which serves, in addition, as a binder for binding particles of the oxidizer into a solid homogeneous mass which upon curing is referred to as a solid propellant grain. Consequently, suitable constituents for solid rocket motors are normally limited to those materials which are compatible with the particular binder used. At the present time, binder fuel materials are almost exclusively hydrocarbon-containing material such as copolymers of butadiene and acrylic acid crosslinked with diepoxides or polyurethane rubber. However, in many instances when an attempt is made to incorporate certain oxidizer constituents into a binder fuel material, the oxidizer is found to be incompatible with the binder fuel or vice versa. This incompatibility over a period of time produces substantial degradation of physical properties in the propellant grain, autoignition or other catastrophic failure because of the interaction between the oxidizer, the binder and the various entrained impurities.

For example, it has been found that when nitronium perchlorate is used as an oxidizer in combination with polybutadiene to form a propellant grain, the nitronium perchlorate seriously degrades the physical properties of the grain. Consequently, special measures, such as coating the nitronium perchlorate, must be taken to prevent the interaction; but these measures invariably reduce the performance characteristics of the system.

The present invention, however, avoids the aforementioned difficulties by employing a unique composite grain configuration wherein the oxidizer and fuel phases are separated into macroscopic modules. Basically, the present invention calls for a laminated composite propellant system consisting of separated phases of fuel and oxidizer made up of alternate rings or washers stacked to form a solid propellant grain. In this manner, the fuel and oxidizer are isolated completely so that materials which are normally incompatible or otherwise unsuitable may be used for a solid propellant.

It is an object, therefore, of the present invention to provide a solid propellant grain which is comprised of fuel and oxidizer constituents which may be chemically incompatible.

Another object of the present invention is to provide a solid propellant grain that may use constituents which were hitherto unsuitable for use in solid grains by virtue of undesirable physical properties.

Yet another object of this invention is to provide a composite grain configuration which substantially reduces the hazard in manufacturing propellant grains by permitting the separate formulation and curing of the fuel phase and oxidizer phase.

It is still a further object of the present invention to provide a composite grain configuration which substantially facilitates the fabrication of solid gas generators.

The specific nature of the invention as well as other objects and advantages thereof will clearly appear from a description of the preferred embodiments as shown in the accompanying drawings in which.

Figure 1:
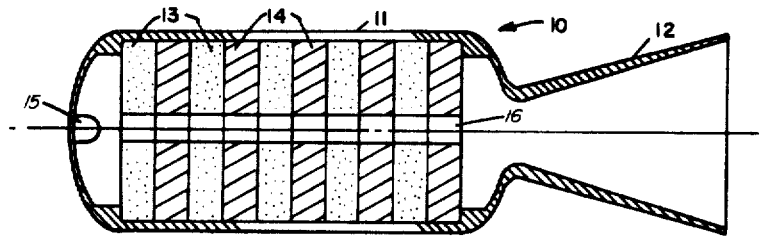
FIG. 1 shows a cross-sectional view of a grain of the present invention.

Referring now to the drawings, there is shown in FIG. 1 a rocket motor 10 comprised of a rocket casing 11 with nozzle portion 12 and containing a plurality of alternate discs of fuel wafers 13 and oxidizer wafers 14. The fuel and oxidizer wafers 13 and 14 are provided with a central perforation 16 so that upon stacking they will produce a port area for combustion. Located at the head end of said rocket motor is a conventional igniter means 15 which is used to initiate the combustion of the solid fuel and oxidizer phases. After firing igniter 15, hot particles and gases from the igniter passing through perforations 16 cause decomposition and gasification at the surface of both the oxidizer and fuel wafers. The oxidizer and fuel gases mix to establish a flame zone which in turn transmits heat back to downstream solid oxidizer and fuel wafers to cause further gasification and burning.

Figure 2:
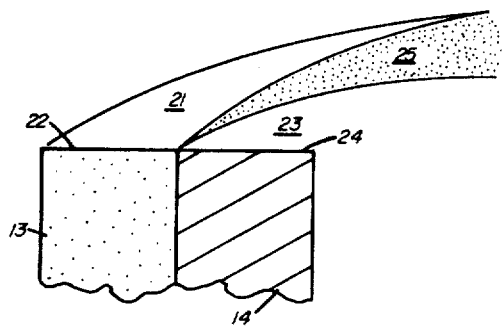
FIG. 2 is an enlarged diagrammatic view of the combustion phenomenon believed to occur at the surface of the grain segments.

In FIG. 2 there is shown an enlarged section of an oxidizer wafer 14 and fuel wafer 13 wherein the combustion processes believed to be operable in the present system are shown in detail. Once ignition is commenced, a flame zone in the grain core produces heat input to create the gas envelope 21 released from fuel disc surface 22. Likewise, the heat input from the core gases produce gasification 23 of the oxidizer wafer 24. The oxidizer and fuel are now in a gaseous state and upon mixing in diffusion zone 25, form a suitable mixture for combustion. Upon combustion, further heat is produced which radiates to the surface of oxidizer and fuel wafers downstream thereof for further combustion. In this manner, the combustion continues to propagate to all the fuel and oxidizer elements 13 and 14 stacked in the motor.

Figure 3:
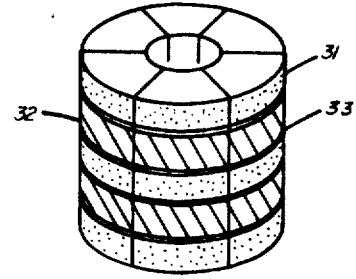
FIG. 3 shows an alternative grain design.
Figure 4:
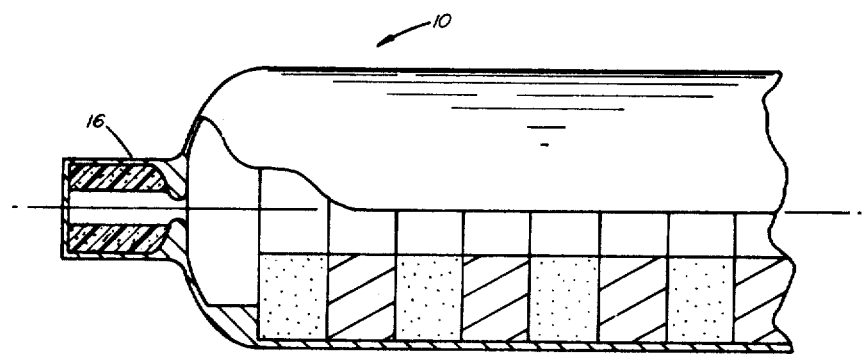
FIG. 4 is a partial cross-sectional view of a gas generator of the present invention employing a sustainer motor.

In FIG. 3 there is shown a stack of laminated composite propellant sections of the present invention made up of pie shaped segments 31 and 32. By using this technique for assembly of the composite solid grain, motors of large physical dimension may be made from comparatively small modules of oxidizer and fuel. In this manner, the manufacture of the individual oxidizer and fuel elements is substantially facilitated. However, in the event it is found that two materials, even upon physical contact are exceedingly reactive, or produce diffusion which degrades the properties of one another, the use of inert separators 33 may be used as shown in FIG. 3. These separators may be comprised of materials such as aluminum foil, which in itself is a suitable fuel and will not detract from system performance.

In general, oxidizers such as nitronium perchlorate and the alkali metal perchlorates such as potassium perchlorate and lithium perchlorate which are not monopropellants have been found to be suitable oxidizers. However, it is obvious that a wide variety of oxidizers other than these may be used. Suitable fuels have been found to be polyethylene and beryllium hydride. Again, a large variety of fuels may be used in combination with appropriate oxidizers to produce a system which has performance characteristics uniquely adapted to a specific mission. Tailoring the stoichiometry of any system is accomplished by the simple expedient of adjusting the thickness of the fuel and oxidizer discs.

As a specific example of a suitable gas generator using the laminated fuel and oxidizer discs of the present invention, the following system employing nitronium perchlorate and polyethylene is described in detail. Nitronium perchlorate, having the following properties

*Physical properties of nitronium perchlorate*

| | |
|---|---|
| Formula | $NO_2ClO_4$. |
| Formula weight | 145.5. |
| Melting point | Decomposes at 90 to 110° C. |
| Physical form | Crystalline solid. |
| Crystal density | 2.25 gm./cc. |
| Heat of formation | 8.74± 0.25 Kcal./mole. |
| Vapor pressure | Ca. 0.002 micron Hg at 25° C. |
| Hygroscopicity | Extremely hydroscopic. | is formed into suitable washer shaped modules by compression molding at pressures of 15,000 to 40,000 p.s.i. to yield satisfactory mechanical properties for the finished module.

Polyethylene of commercial grade is cast, machined or extruded and cut into washer shaped modules having an outside diameter of 2.5 inches and a port diameter of 1.5 inches, giving a web thickness of 0.5 inch. These wafers have a thickness of 0.25 inch. For proper chemical stoichiometry, the nitronium perchlorate wafers are also 0.25 inch thick. The thickness of the modules is governed by the relative densities of the fuel and oxidizer and the desired stoichiometry. By stacking these individual modules on a one-to-one ratio into a close fitting motor casing, a gas generator is produced in accordance with the present invention. An igniter containing 25 grams of boron-potassium nitrate igniter pellets is placed forward of the composite grain.

Since the regression rate of the laminated composite may be relatively low in some instances, it has been found that by using a small sustainer motor in the forward end of the rocket motor, as shown in FIG. 3, the burning rate of the main motor may be substantially increased. Sustainer motor 16 can also be used for ignition purposes and may be designed to produce a programmed thrust to the overall system.

A suitable sustainer motor can be made by employing a conventional aluminized composite propellant such as polybutadiene binder, 16.0 percent by weight; aluminum, 16.0 percent by weight; and ammonium perchlorate, 68.0 percent by weight. The sustainer charge may be of any suitable configuration to give the required burning time and mass flow.

It is obvious that sustainer motors comprised of small liquid motors or injectors or hypergolic fluids may, likewise, be used to give a wider range of throttling.

It should be understood that the discs or washers of the present invention may be made from any suitable fuel and oxidizer material. Moreover, it will be apparent to one skilled in the art that alternate slabs of fuel and oxidizer oriented longitudinally or axially may be used, or multiple perforations may be employed in the grain discs and, in addition, these perforations may be offset to impart a spiralling motion to the gases to increase regression rate.

Obviously many modifications or variation of the present invention are possible by the above teachings. It is therefore to be understood that within the scope of the appended claims, the invention may be practiced otherwise than as specifically described.

What is claimed is:

1. A method of operating a variable thrust rocket motor which comprises generating hot gases, igniting a composite propellant grain in a combustion chamber by passing said hot gases across the surface of said grain, said grain comprising alternately arranged solid fuel and solid oxidizer modules, said solid fuel and solid oxidizer modules being formed from materials which are not monopropellants; and varying the flow rate of said hot gases whereby the thrust output of said rocket motor is varied.

2. The method of claim 1 wherein said grain is provided with a longitudinally extending port and said hot gases are passed through said port.

3. The method of claim 2 wherein said solid fuel modules and said solid oxidizer modules are arranged to form longitudinally alternating fuel and oxidizer discs with said port passing through said discs.

4. The method of claim 1 wherein said fuel and oxidizer modules provide a stoichiometric mixture ratio of fuel and oxidizer.

References Cited

UNITED STATES PATENTS

| | | | |
|---|---|---|---|
| 2,926,613 | 3/1960 | Fox | 149—87 X |
| 2,977,885 | 4/1961 | Perry et al. | 149—15 X |
| 3,006,743 | 10/1961 | Fox et al. | 149—19 |
| 3,056,255 | 10/1962 | Thomsen | 60—35.4 |
| 3,056,701 | 10/1962 | Fritzlen | 149—15 X |
| 3,163,113 | 12/1964 | Davis et al. | 149—2 X |
| 3,137,127 | 6/1964 | Grosse et al. | 60—219 |
| 3,065,596 | 11/1962 | Schultz | 60—207 |
| 3,065,597 | 11/1962 | Adamson et al. | 60—220 |
| 3,065,598 | 11/1962 | Schultz | 60—207 |

BENJAMIN R. PADGETT, *Primary Examiner.*